Feb. 28, 1950      G. SCHULEIN      2,499,333

SPRING PACKING

Filed May 12, 1948

INVENTOR
GEORGE SCHULEIN

Strauch & Hoffman
ATTORNEYS

Patented Feb. 28, 1950

2,499,333

UNITED STATES PATENT OFFICE 2,499,333

SPRING PACKING

George Schulein, Chicago, Ill., assignor to National Waste Company Incorporated, New York, N. Y., a corporation of Illinois Application May 12, 1948, Serial No. 26,689

10 Claims. (Cl. 308—243)

1

The present invention relates to spring packing, that is to packing material of waste having a plurality of springs embedded therein.

Spring packing is well known and has been in use for many years in journal boxes of railroad cars. Ordinarily, spring packing is made by placing a specified quantity or weight of springs in a specified quantity or weight of waste and the resulting mass is usually shipped and sold in bulk form such as bales. These bales are opened by the purchaser as needed and the spring packing kept in bins or barrels. When a journal box is to be repacked for example, the mechanic reaches into the bin or barrel and removes the amount of spring packing necessary for the particular job.

In spring packing as heretofore made, the springs were not firmly anchored in or to the waste so that when the mechanic removed from the bin or barrel the portion to be used, springs would often drop out and be lost. The spring packing would then not contain the proper ratio of springs to assure maximum performance.

The springs heretofore used in spring packing have had a further disadvantage in that the ends of the springs often caused serious injury to the hands of a mechanic handling the waste. These ends would often cut or puncture the hands of the mechanic and serious infections have resulted.

Numerous efforts have been made to overcome these defects and disadvantages of spring packing but prior to the present invention these efforts have not been successful. The present invention corrects and overcomes these defects.

One of the objects of the present invention is to provide improved spring packing.

Another object is to provide spring packing which is safe to handle.

A further object is to provide spring packing in which the springs resist pressure from any direction.

A still further object is to provide spring packing in which the springs are anchored to the waste.

These and other objects and advantages reside in certain novel features of construction and relation of parts as will hereinafter be more fully set forth and pointed out in the appended claims.

Referring to the drawing.

2 the spring gripping the strands or threads of the waste.

Figure 3:

Figure 3 shows a mass of spring packing.

Figure 4:

Figure 4 is a fragmentary elevation of a modified form of spring.

Figure 5:

Figure 5 is a fragmentary plan view of another modified form of spring.

Figure 6:

Figure 6 is a fragmentary elevation of another modified form of spring.

The spring packing of the present invention consists principally of a body of waste 10 which may be of cotton, wool or other fibers or of a mixture of different fibers. As shown in Figure 3, springs 11 are distributed throughout the body of waste in random fashion and are embedded therein.

Figure 1:
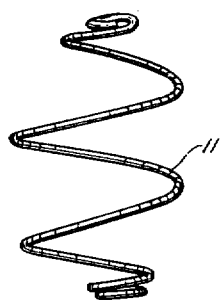
Figure 1 is an elevation of a spring for use in the spring packing of this invention.
Figure 2:
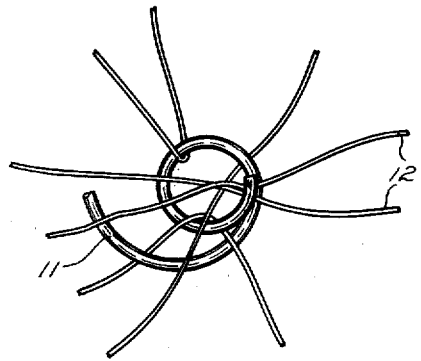
Figure 2 is a fragmentary plan view showing

A preferred form of spring 11 is illustrated in Figures 1 and 2. This spring 11 is formed of suitable wire such as brass spring wire. The coils of the spring 11 are relatively large and relatively widely spaced in the center and diminish both in radius and spacing toward each end so that the spring 11 as a whole is of generally spheroidal shape. Heretofore, the springs used in spring packing have been of generally cylindrical shape as shown in Patent No. 1,542,098 and the spheroidal shape of the springs of the present invention affords better resistance to pressures at angles to the axis of the coils.

In the preferred form of spring illustrated in Figures 1 and 2, the end is close against the adjacent coil so as to resiliently grip the fibers 12 as shown in Figure 2. This resilient gripping action anchors the springs 11 securely in the waste 10.

The end of the wire forming the spring 11 is not covered but lies so close to the adjacent coil that it is practically impossible for one handling the spring packing to be injured. Puncture wounds, which are very dangerous, are impossible.

Figure 4 shows one end of a modified spring 13 embodying this invention. The spring 13 is of the same general spheroidal shape as the spring 11 but the end is spaced from the adjacent coil. The space between the end and the adjacent coil is sufficient to permit strands of the waste 10 to pass freely but not enough for the end to constitute a hazard for one handling the packing. As in the preferred form, puncture wounds are impossible.

In the modification shown in Figure 5, the end of the spring 14 does not extend to the adjacent coil and the space between the end and the adjacent coil is sufficient to pass strands or threads of the waste 10. This spring 14 has the same spheroidal shape as the spring 11.

In the modifications shown in Figures 4 and 5, the end serves as a hook to anchor the spring in the waste 10.

Figure 6 shows another modified form of spring. The spring 15 has the same spheroidal shape as the others and the end extends along the inside of the last coil and substantially in contact therewith. As in the modification shown in Figures 1 and 2, the end of the spring 15 resiliently grips the threads or strands of waste to anchor the spring thereto.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed and desired to be secured by United States Letters Patent is:

1. Spring packing comprising a body of waste having a plurality of springs distributed throughout said body and embedded therein, such springs being formed with relatively few, relatively open spiral coils, the coils at each end of such springs being smaller than the coils in the center.

2. Spring packing comprising a body of waste and a multiplicity of spiral coil springs distributed throughout said body and embedded therein, the radius of the coils of such springs diminishing from the center toward each end.

3. Spring packing comprising a body of waste and a multiplicity of spiral springs distributed throughout such body and embedded therein, said springs being of generally spheroidal shape.

4. Spring packing comprising a body of waste having a plurality of spiral coil springs therein, such embedded springs having relatively widely spaced coils in the center, the spacing between adjacent coils diminishing toward each end.

5. Spring packing as defined in claim 4 in which the ends of such springs are so close to the adjacent coils as to prevent substantial injury from contact with said ends.

6. Spring packing as defined in claim 5 in which the ends of such springs are spaced from the adjacent coils as to permit the passage of strands of waste therebtween.

7. Spring packing comprising a body of waste having a plurality of spiral coil springs embedded therein, such springs having relatively widely spaced coils in the center and means at one end for resiliently gripping strands of waste.

8. Spring packing as defined in claim 7 in which such springs have means at both ends for resiliently gripping said waste.

9. Spring packing comprising a body of waste having a plurality of springs embedded therein, such springs comprising spiral coils of wire, such coils being relatively large and widely spaced in the center and diminishing in radius and spacing toward each end.

10. Spring packing as defined in claim 9 in which the outer coils of such springs extend along the adjacent coils substantially in contact therewith.

GEORGE SCHULEIN.

REFERENCES CITED

The following references are of record in the file of this patent:

UNITED STATES PATENTS

| Number | Name | Date |
| --- | --- | --- |
| 2,320,706 | Ripley et al. | June 1, 1943 |